Aug. 20, 1968  G. HUBER ET AL  3,398,053
SPACER FOR BOX-SHAPED NUCLEAR FUEL ELEMENT
Filed Sept. 1, 1966  2 Sheets-Sheet 1

United States Patent Office 3,398,053
Patented Aug. 20, 1968

3,398,053
SPACER FOR BOX-SHAPED NUCLEAR
FUEL ELEMENT
Gerald Huber, Diethelm Knödler, and Hans Kröpfl,
Erlangen, Germany, assignors to Siemens Aktiengesellschaft, Erlangen, Germany, a corporation of Germany
Filed Sept 1, 1966, Ser. No. 576,618
Claims priority, application Germany, Sept. 3, 1965,
S 99,223
8 Claims. (Cl. 176—78)

ABSTRACT OF THE DISCLOSURE

Spacer for fuel rods received in respective mesh defined by intersecting crosspieces of structural material in a lattice frame forming, with a perforated outer wall of structural material, a box-shaped nuclear fuel element, includes two rigid structural elements and a loose, resilient structural element located in each of the mesh.

---

Figure 1:
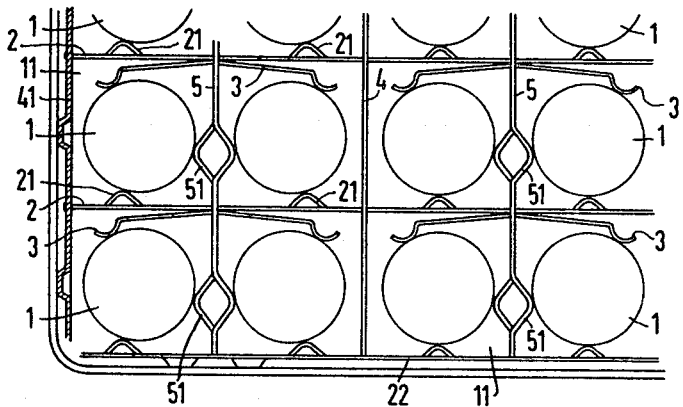

Our invention relates to spacer for box-shaped nuclear fuel element.

In many cases, the fuel elements required for heterogeneous nuclear reactors have a box-like shape. They contain a great number of very thin though long nuclear fuel rods, however, which must be secured in position therein by so-called spacers. Known spacer structures consist of a screen-like frame made up of a large number of crosspieces crossing one another at right angles, a fuel rod being inserted into each of the mesh spaces produced thereby. In order to center these fuel rods in the mesh cavities, structural elements in the shape of projections and fins are formed of the crosspiece material. These structural elements must be partly resilient in order to accommodate to production tolerances and varying thermal expansions during the operation of the reactor. The material required for such resilient spacers, however, has a relatively large neutron-absorption cross section and thereby affects the neutron balance of the reactor to an undesirable extent.

It is accordingly an object of our invention to provide a spacer for box-shaped nuclear fuel elements having a preferably perforated outer wall of structural material wherein a plurality of fuel rods are individually secured in the mesh of a crosspiece screen or lattice of structural material, which avoids the aforementioned disadvantages of the heretofore known spacers.

With the foregoing and other objects in view, we provide in the mesh of a screen frame structure of a fuel element, one loose and resilient and two rigid structural elements between which a fuel rod is received. The rigid structural elements are formed from the screen crosspieces per se, and the resilient structral element is inserted loosely in the screen frame. The screen-like crosspieces are made up of a material which is only slightly neutron absorbent, such as for example zirconium or a zirconium alloy. Only the resilient, inserted structural element consists of stainless steel or a high temperature-resilient and corrosion-resistant nickel alloy. The latter materials, of course, have a considerably greater neutron absorption cross section than zirconium. However, the ratio of the smaller to the greater neutron-absorbent cross section of the materials is so large that the material of the resilient structural element has only a very weak effect on the energy balance of a reactor.

Other features which are considered as characteristic for the invention are set forth in the appended claims.

Although the invention is illustrated and described herein as embodied in spacer for box-shaped nuclear fuel element, it is nevertheless not intended to be limited to the details shown, since various modifications and structural changes may be made therein without departing from the spirit of the invention and within the scope and range of equivalents of the claims.

Figure 3:
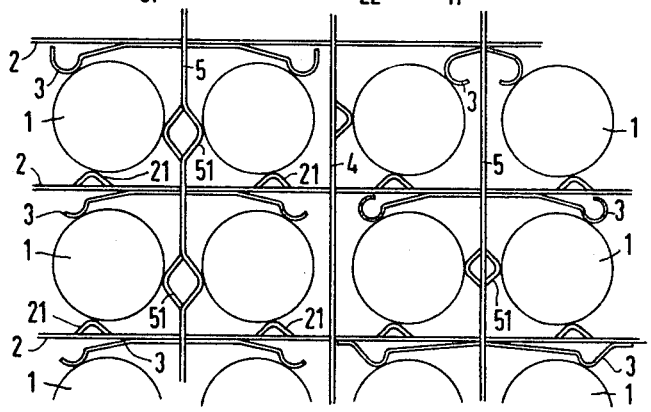
Figure 2:
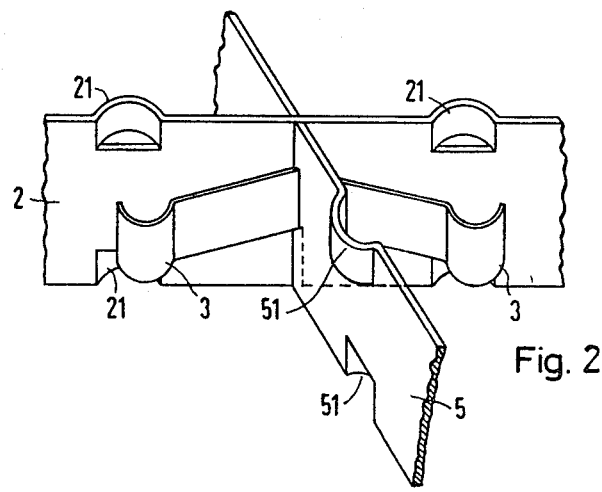
Figure 2A:
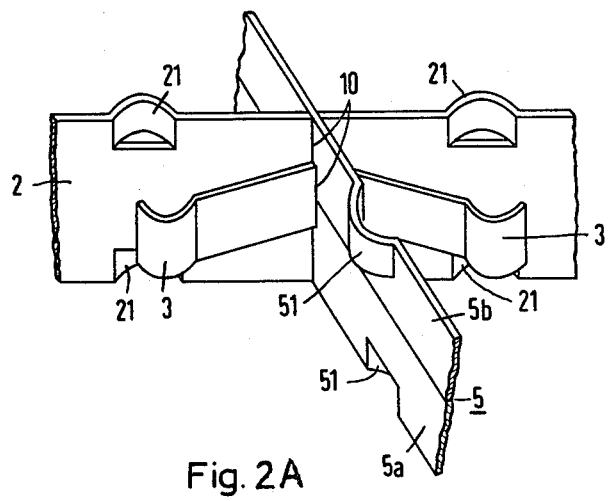

The construction and method of operation of the invention, however, together with additional objects and advantages thereof, will be best understood from the following description of specific embodiments when read in connection with the accompanying drawings, in which:

FIG. 1 is a fragmentary cross section through a fuel element provided with spacers in accordance with our invention;

FIGS. 2 and 2A are fragmentary perspective views of a fuel element screen structure showing two different connections between the resilient elements of the spacers and the individual screen crosspieces; and FIG. 3 is another fragmentary cross-sectional view of a fuel element showing various spacers having several different embodiments of the resilient elements thereof constructed in accordance with our invention.

Referring now to the drawings, and first particularly to FIG. 1 thereof, there are shown fuel rods 1 which are received in the mesh formed by the interesting screen crosspieces 4 and 5 formed of zirconium or zirconium alloy. The spacer proper consists of the resilient element 3 formed of stainless steel or a high heat-resistant and corrosion-resistant nickel alloy, and rigid projections 21 and 51 with which the screen crosspieces 2 and 5, as clearly shown in FIG. 1, are provided and which for example can be made of stamped-out and inwardly bent portions of the crosspieces. These projections thus form the rigid and fixed installation points for the fuel rod which is to be secured. The third holding point, however, is resiliently formed by the member 3. The member 3 extends respectively over two adjacent mesh, that is, each end of the springy element 3 engages one fuel rod.

In FIG. 2 there is shown how a resilient element 3 can be held at the junction of the screen crosspieces 2 and 5 of FIG. 1. A rigid connection is not necessary therefor. The crosspieces 5 can also consist of a lower and an upper portion 5a, 5b, as shown in FIG. 2A, which can be connected by means of suitable slotting 10 with the crosspieces 2 and the resilient elements 3.

In FIG. 3 there is shown a fragmentary schematic cross-sectional view of the fuel element in which a plurality of different embodiments of the resilient element 3 are illustrated. The spring force required can be adjusted by varying the length of the resilient arms of the element 3. By adjusting the size of the bend at the end of the element 3, the permissible travel of the spring can be limited so that after a specific permissible amount of bending thereof, even the element 3 acts as a rigid stop or engagement point for the fuel rod 1. Naturally, the location of the projections 21 and 51 is dependent upon and varies with the length of the resilient element 3. These can accordingly also be employed for controlling the coolant flow within the individual mesh in order to improve the cooling action and the exchange of coolant between adjacent mesh. It is of course also clear that it is possible to provide a three-point mounting of the fuel rod not only in a horizontal plane, but also in the vertical direction. For this purpose, it is necessary only that the rigid supporting points of each crosspiece be doubled, for example, be located at the upper and the lower edges, as for example of the crosspiece 2 of FIGS. 2 and 2A, and that the resilient element 3 have its supporting point in the center plane of this crosspiece screen. A stable support of the fuel rods is thereby possible when viewed in the vertical direction because the spring force is counterbalanced and can never act in the form of a bending moment on the fuel rod 1.

From the illustrated and aforedescribed embodiments it is clear that the bulk of the material of the spacer consists only of slightly neutron-absorbing material, and only a relatively small portion, namely the small spring element 3, is formed of a material having a high neutron-absorption cross section. Due to the complete security afforded by the mechanical properties or characteristics of the holder, only a very slight effect is exerted upon the neutron balance of the entire reactor as compared to the effect produced by the spacers heretofore known in the art. Obviously, other constructions having all of the aforementioned advantages are possible, in accordance with the basic principles and within the scope of the instant application.

It is also noted that the screen crosspieces with which the box-shaped wall surrounding the fuel element is rigidly connected for example by soldering or welding, also contribute to an increase in the strength thereof, or, as a corollary thereto, permit the use of thinner sheet metal for the walls while maintaining the same strength.

We claim:
1. In a box-shaped nuclear fuel element having a perforated outer wall of structural material and a lattice frame formed of intersecting crosspieces of structural material defining a plurality of mesh within which fuel rods are respectively received, a spacer for the fuel rods in the respective mesh, said spacer comprising two rigid structural elements and a loose, resilient element located in each of two adjacent mesh, said resilient elements in said two adjacent mesh being integral with one another and forming together a strip-shaped structure having a central elongated portion and a bent portion at both ends thereof.

2. Spacer according to claim 1 wherein said rigid structural elements are formed from the crosspieces defining said mesh, said resilient elements being loosely received in said lattice frames, said ends thereof respectively forming the resilient structural elements in said two adjacent mesh.

3. Spacer according to claim 1 wherein said resilient strip element is located substantially perpendicularly to one of said intersecting crosspieces, said one crosspiece comprising a pair of superimposed longitudinally extending halves formed with suitable slotting for connection with the other of said intersecting crosspieces and for holding said resilient strip element in position in said mesh.

4. Spacer according to claim 1 wherein said intersecting crosspieces are rigidly connected to said outer wall of said fuel element for reinforcing said wall.

5. Spacer according to claim 4 including a joint of solder material connecting said crosspieces and said wall to one another.

6. Spacer according to claim 4 including a joint of welding material connecting said crosspieces and said wall to one another.

7. Spacer according to claim 1 wherein said crosspieces are formed of zirconium alloy having only slight neutron-absorbing properties compared to the remainder of the material of the spacer and said resilient structural element is formed of metal selected from the group consisting of stainless steel and of those nickel alloys having relatively high heat resistance and relatively great corrosion resistance.

8. Spacer according to claim 1 wherein said rigid structural elements are located opposite one another at both longitudinally extending edges of said intersecting crosspieces so that twice the number of said two rigid structural elements disposed in two planes are provided for each of said mesh, whereby a stable three-point mounting of a fuel rod extending in a vertical direction can be effected by said rigid structural elements and said loose, resilient structural element.

References Cited

UNITED STATES PATENTS

| | | | |
|---|---|---|---|
| 3,068,163 | 12/1962 | Currier et al. | 176—78 |
| 3,228,854 | 1/1966 | Bekkering et al. | 176—78 |
| 3,255,090 | 6/1966 | Liervik | 176—76 |
| 3,255,091 | 6/1966 | Frisch | 176—76 X |
| 3,267,000 | 8/1966 | Ashcroft et al. | 176—78 X |
| 3,298,922 | 1/1967 | Prince et al. | 176—76 X |
| 3,301,764 | 1/1967 | Timbs et al. | 176—76 X |
| 3,301,765 | 1/1967 | Eyre et al. | 176—76 X |
| 3,350,275 | 10/1967 | Venier et al. | 176—78 |

FOREIGN PATENTS

| | | |
|---|---|---|
| 1,086,356 | 8/1960 | Germany. |
| 1,104,082 | 4/1961 | Germany. |
| 969,131 | 9/1964 | Great Britain. |
| 973,137 | 10/1964 | Great Britain. |
| 975,297 | 11/1964 | Great Britain. |

CARL D. QUARFORTH, *Primary Examiner.*

M. J. SCOLNICK, *Assistant Examiner.*

UNITED STATES PATENT OFFICE
CERTIFICATE OF CORRECTION

Patent No. 3,398,053                           August 20, 1968

Gerald Huber et al.

It is certified that error appears in the above identified patent and that said Letters Patent are hereby corrected as shown below:

In the heading to the printed specification, line 9, "S 99,223" should read -- S 99,233 --.

Signed and sealed this 20th day of January 1970.

(SEAL)
Attest:

Edward M. Fletcher, Jr.                      WILLIAM E. SCHUYLER, JR.
Attesting Officer                                Commissioner of Patents